July 1, 1969 J. J. ZALOUDEK 3,452,772
PRESSURE OPERATED VORTEX CONTROLLED FLUID ANALOG AMPLIFIER
Filed Sept. 29, 1966

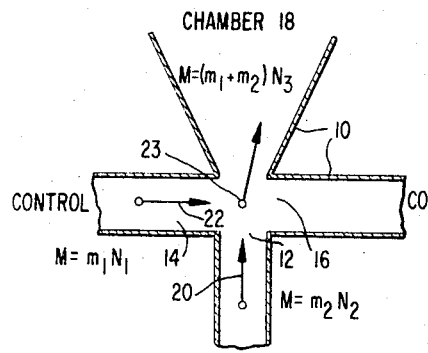

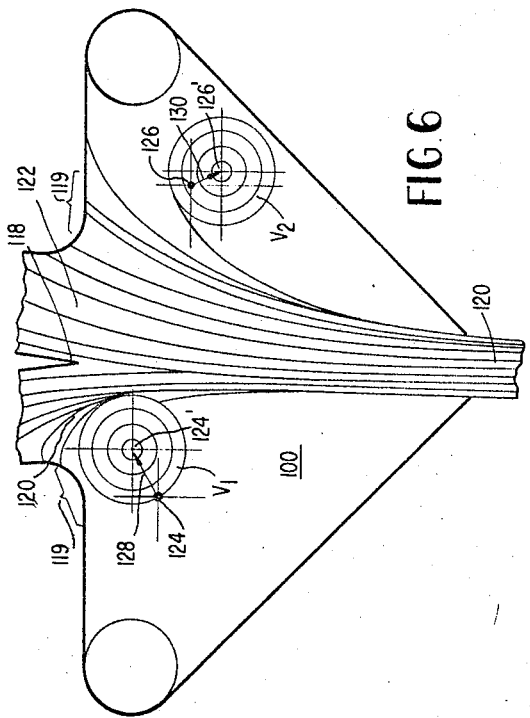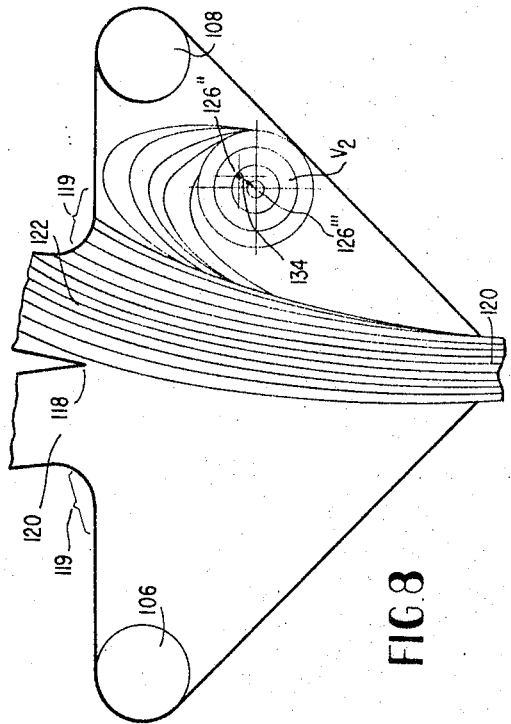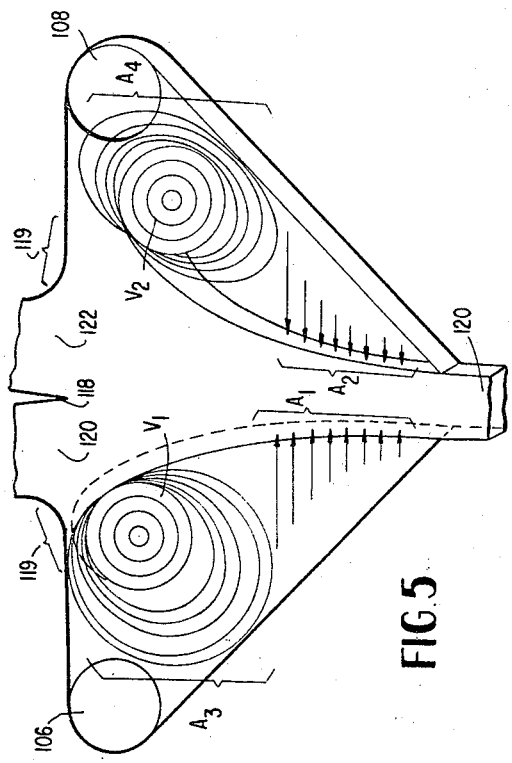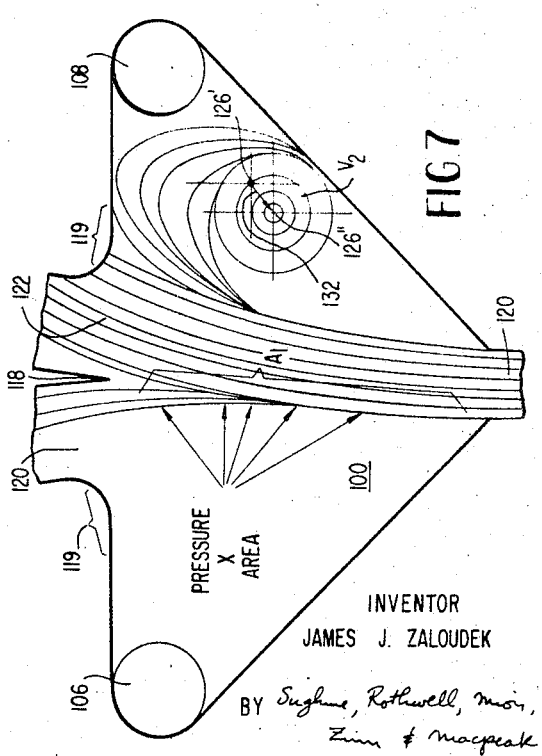

INVENTOR
JAMES J. ZALOUDEK

BY Sughrue, Rothwell, Mion, Zinn & Macpeak
ATTORNEYS

United States Patent Office 3,452,772
Patented July 1, 1969

3,452,772
PRESSURE OPERATED VORTEX CONTROLLED FLUID ANALOG AMPLIFIER
James J. Zaloudek, Baltimore, Md., assignor to Martin-Marietta Corporation, New York, N.Y., a corporation of Maryland
Filed Sept. 29, 1966, Ser. No. 583,039
Int. Cl. F15c 1/16
U.S. Cl. 137—81.5                              7 Claims

ABSTRACT OF THE DISCLOSURE

In a fluid analog amplifier, the power stream flows from an inlet through a control chamber to output ports. A wall of the control chamber intercepts portions of the fanning power stream and creates free vortexes on either side of the power stream. A differential pressure created between control ports located in the control chamber a substantial distance downstream from the power stream inlet causes the free vortexes to move so as to selectively block the power stream from the chosen output port.

---

Figure 9:
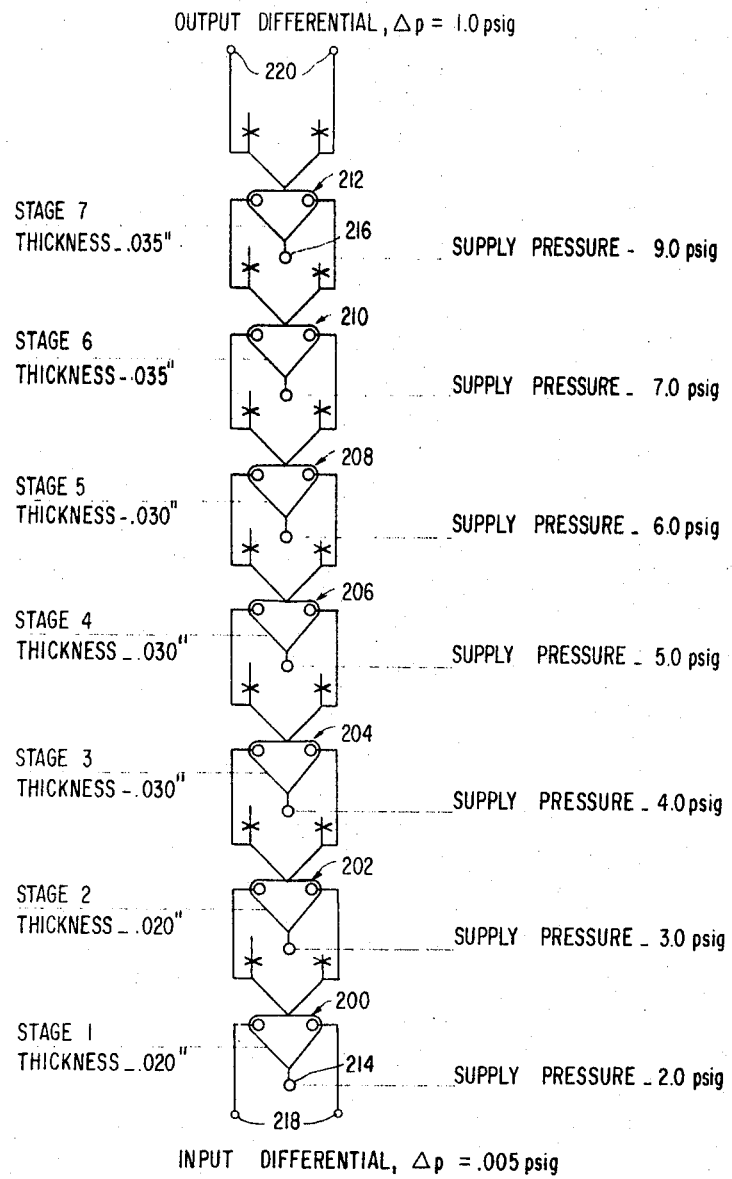

This invention relates to a pure fluid analog amplifier, and more particularly, to one in which control pressures operate directly on vortexes purposely created by the power stream to control power stream output.

Pure fluid amplifiers have lately come into vogue and in existing analog devices, the principle of operation is based on momentum exchange; that is, one particle of air from a control jet strikes another particle of air from a supply jet, thus producing a change in direction of the supply stream. Basically, a pure fluid analog amplifier constitutes a proportional device having one supply port, two control ports and two output ports. When a differential pressure is applied across the control ports, an output pressure differential is produced. Since the output pressure differential is greater than the input pressure differential, the device is said to have a differential gain. The control differential pressure usually means a pressure greater than atmospheric on both control ports. The analog amplifier may work with a control signal on only one control port and at atmospheric pressure on the other. However, this is not the normal operation and is quite different from the operation of a flip-flop or binary element.

All fluidic elements which have passages that restrict and control the direction of flow will have fluid vortexes produced in them. In many of the analog amplifiers that exist today, vortexes are formed on each side of the divider at the receiver end. In existing analog amplifiers, these vortexes are not desired and consequently, their influence is minimized by placing them in chambers to restrict their movement. In such analog amplifiers, the principle of operation is basically momentum exchange between control ports and supply ports with no vortex movement. While there may also be a pressure times area phenomenon present in these devices, the pressure times area phenomenon has a much lesser effect than the momentum exchange and its effect is generally inconsequential. The effect becomes substantial only when the control ports are moved up and back. When this is done, the momentum effect is lost.

It is, therefore, a primary object of this invention to provide an improved, pure fluid analog amplifier which does not rely upon momentum exchange between control ports and supply ports for its operation.

It is a further object of this invention to provide an improved, pure fluid analog amplifier which operates in response to movement of a purposely created supply stream vortex within the amplifier chamber to produce an output pressure differential.

It is a further object of this invention to provide an improved, pure fluid analog amplifier of this type in which fluid control signals affect the vortexes by a pressure times area phenomenon to control the power jet stream.

It is a further object of this invention to provide an improved, pure fluid analog amplifier of this type which will operate over a wider range of supply pressures and control pressures than known pure fluidic elements, while providing increased pressure gain.

It is a further object of this invention to provide an improved, pressure operated vortex controlled fluid analog amplifier which does not require close impedance matching, involves simple element geometry, is easy to produce, is of a sturdy construction and eliminates the vents necessary in existing analog elements.

Further objects of this invention will be pointed out in the following detailed description and claims and illustrated in the accompanying drawings which disclose, by way of example, the principle of this invention and the best mode which has been contemplated of applying that principle.

In the drawings:
FIGURE 1 is a plan view of a conventional pure fluid analog amplifier whose principle of operation is based on momentum exchange.
FIGURE 2 is a plan view of a conventional pure fluid bistable device.
FIGURE 3 is a plan view of a conventional fluidic analog element in which multiple vortexes occur but are placed in chambers to restrict their movement.
FIGURE 4 is a plan view of the improved pressure operated vortex control, pure fluid analog amplifier of the present invention under balanced conditions.
FIGURE 5 is a partial perspective view of a section of the fluidic element shown in FIGURE 4 showing the pressure times area displacement of the supply jet and initial displacement of the vortexes from left to right.
FIGURE 6 is a plan view of a portion of the fluidic element of FIGURE 4 showing vortex displacement in which the left-hand vortex blocks the left-hand receiver opening.
FIGURE 7 is a plan view of a portion of the element of FIGURE 4 in which the amplifier has reached the initial saturation point as the result of vortex shifting and elimination of the left-hand vortex.
FIGURE 8 is plan view of a portion of the element shown in FIGURE 4 at the point of complete saturation of the amplifier.
FIGURE 9 is a schematic view of a seven stage analog amplifier system employing multiple pressure operated vortex controlled fluid analog amplifiers of the present invention.

In general, the present invention is directed to a pure fluid analog amplifier comprising an amplifier control chamber, jet power stream inlet means coupled to the chamber, amplifier outlet means coupled to the chamber and generally in line with the power stream inlet, and control port means entering the chamber at right angles to the path of the power stream and located substantially downstream from the power stream inlet means. The geometry of the amplifier chamber is such that a portion of the jet power stream entering the chamber forms free vortexes within the chamber between the control port means and the power stream. A control stream pressure differenial across the control port means causes the vortexes to move within the chamber and block the passage of the jet power stream from the inlet means to the outlet means.

In a preferred form, the amplifier control chamber has a triangular plan configuration with the jet power stream inlet located at the apex and two receiver openings located in the opposing side (base) substantially opposite the inlet. The control ports are coupled to the amplifier along the triangular base line to the side of left and right-hand receiver openings which are in line with the chamber apex. The control ports are perpendicular to the plane of the fluid passing through the fluid amplifier chamber to eliminate momentum exchange between the moving fluids.

Referring to the drawings, there is shown in FIGURE 1 a plan representation of a basic pure fluid amplifier of the momentum exchange type. Casing wall 10 defines a fluid supply port 12, a pair of left and right-hand control ports 14 and 16, respectively, with the wall 10 opening up in the direction of amplifier chamber section 18. The supply jet tends to move from supply port 12 toward the center of chamber 18 with a momentum force, as indicated by arrow 20, having a value depending upon its flow mass and velocity. Likewise, the fluid flowing from the left-hand control port 14 has a momentum force which varies directly with its mass and rate of flow, as indicated by arrow 22. Both supply and control flows are along the same plane and intersect at point 23 adjacent the point of entry of the supply stream. As a result of momentum exchange, deflection of the supply jet occurs. Arrow 24 indicates, vectorially, the result of the impingement of the control force on the supply jet. The new momentum force, as indicated, is the sum of the flow masses times the new velociy.

This conventional pure fluid analog amplifier operation is to be contrasted to the typical flip-flop or binary fluid element of FIGURE 2. Referring to this figure, it is noted that the wall members 30 form a fluidic element having again, a central supply port 32 and a pair of right angle control ports 34 and 36 adjacent thereto, allowing opposed control pressures C1 and C2 to act upon the main jet stream 38 at point 39 to cause the same to exhaust through either outlet port 40 or 42. Such devices are bistable in which the presence of a pulsed control signal at either left-hand control port 34 or right-hand control port 36 causes the jet stream 38 to switch from one side of the element to the other. Binary fluid elements normally work on the Coanda principle such that the supply jet will hug the outside wall of the outlet opposite the control port last pulsed. In the device shown in FIGURE 2, pulsing of control port 34 has caused the jet stream 38 to hug the right-hand wall surface of outlet 42. As indicated, there is no pressure and no flow in outlet 40.

While existing analog amplifiers work on the basis of momentum exchange with no vortex movement, such devices, since they have restricting and control passages, have produced therein, vortexes. Referring to FIGURE 3, in a typical device, as the supply jet 50 passes from supply port 52 into amplifier chamber 54 and past adjacent control passages 56, due to the geometry, the supply stream 50 tends to fan out and right and left-hand vortexes 58 and 60 are formed by the impingement of the supply jet on the receiver area. The main portion of the supply jet stream 50 passes, in this case proportionately, through receiver or receiver openings 67–68 to outlet ports 62 and 64 as a result of centrally impacting divider 66. The vortexes 58 and 60 are formed on each side of left and right-hand receivers 67 and 68, respectively. Since the vortexes 58 and 60 are not desired, their influence is minimized by placing them in specially formed chamber sections 69 and 70 to restrict their movement. With their movement restricted, this type of pure fluid analog amplifier operates basically as a result of momentum exchange between the control ports and the supply ports with no vortex movement. Since the control ports 56 are in the vicinity of the inlet from the supply jet to the chamber 54, even though there may be some pressure times area phenomenon present, this pressure times area phenomenon has a much lesser effect than the basic momentum exchange and control is achieved in the same manner as set forth in FIGURE 1.

The present invention is based on the discovery that the presusre times area phenomenon becomes substantial only when the control ports are moved up and back with respect to the chamber 54. When this is done, the momentum exchange effect is lost. The present invention is further based on the fact that rather than attempting to eliminate or prevent the formation of vortexes within the chamber, measures are taken to actually create vortexes between the supply jet and the control port while using the pressure times area phenomenon on the vortexes themselves to influence the jet as it moves from its supply port toward the output ports of the fluid amplifier.

The pressure operated vortex controlled fluid analog amplifier of the present invention, as shown somewhat schematically in the plan view of FIGURE 4, involves a rather large, generally triangular chamber 100 including a supply port 102 and a right angle supply conduit 104 opening up into the chamber at the bottom or apex end thereof. A pair of opposed left and right-hand control ports 106 and 108 are downstream, at the top and extreme outer ends of the chamber. A pair of outlet ports 110 and 112 are positioned at some distance from the triangular chamber 100 and are connected by means of respective output legs 114 and 116 to the triangular chamber, the legs 114 and 116 being angled slightly away from each other and from a center line drawn vertically from the supply port through the chamber. A central divider 118 acts to divide the power jet stream 120 and cause equal flow to output ports 110 and 112 in the absence of a pressure differential across control ports 106–108. Since the power jet stream 120 fans out within the chamber 100, a portion of the jet stream on either side will impact the top edge or planar base of the triangular shaped chamber in the areas 119 to either side of the receiver opening to form the vortexes V1 and V2. This ensures the presence of left and right-hand vortexes V1 and V2 in the chamber normally outside of receiver openings 120 and 122, respectively. The vortexes are thus positioned between the power jet 120 and respective control ports 106–108. Unlike most pure fluid analog amplifiers, the control ports have their axis generally at right angles to the plane of the flow path of the fluid through the amplifier. The pure fluid amplifier of the present invention is constructed in conventional form from multiple layers of relatively thin shim stock or the like, etched to provide the desired geometry, including overlying and underlying solid sheet stock to provide a completely closed chamber 100. However, the fluid logic element may alternately be formed by molding, casting, etching or other conventional cavity and passage forming techniques within a single, solid plate or other laminate structure.

Connection of a supply source to supply port 102 results in jet stream 120 diverging within the chamber, striking the top of the chamber and forming the vortexes V1 and V2 which are simply swirling masses of air or other fluid. Analog operation occurs when a control source is connected to either left-hand control port 106 or right-hand control port 108. The control port pressure differential thus formed affects the vortexes and the supply jet producing an output pressure differential across ports 110–112. Since the output pressure differential is several times greater than the control differential, the element fufills the requirements of an amplifier. The unique part of an analog amplifier is the method of control. The control source differential is fed into the control ports and acts directly on the vortexes V1–V2. Under balanced conditions, when the control pressures are equal and output peressures are equal, the vortexes are located just outside the receiver areas 120–122 and toward the top of the chamber 100. When a control source differential pressure is applied to the control ports 106–108, such that the $Pc_1$ at port 106 is greater than $Pc_2$ at port 108, the vortex V1 nearest the higher pressure is given a displacement in the direction of decreasing pressure and the other vortex V2 undergoes a much smaller displacement in the same direction. Reference to FIGURE 6 shows the direction and extent of change in position of vortexes V1 and V2, respectively, as a result of the pressure differential between control ports 106 and 108. The center of vortex V1 is moved from point 124 within chamber 100 to point 124', a distance and direction indicated by arrow 128 while the right-hand vortex V2 moves downwardly and to the right from point 126 to point 126', as indicated by arrow 130. In so moving, the vortex V1 has moved to a partial blocking with respect to receiver opening 120. The vortex V2 in moving downwardly to the right has not affected at all the passage of the power jet through right-hand receiver opening 122.

1. It is important to note that while the vortexes mainly serve as a means of transmitting control from the control ports to the supply jet to effect deflection, some supply jet deflection is also produced by a pressure times area phenomenon along the jet stream at areas other than that of the vortexes. This may be seen by reference to FIGURE 5 wherein the fluid pressure acts upon area A1 beneath the left-hand vortex V1, while fluid pressure acts on the control stream area A2 beneath right-hand vortex V2. Of course, $Pc_1$ is acting principally on vortex V1 at area A3 while $Pc_2$ is acting principally on vortex V2 at area A4. Not only is the area A1 larger than the area A2, but the pressure on the left-hand side of the chamber is greater with respect to the pressure on the right-hand side of the chamber, since there is a pressure differential between control ports 106 and 108. As the pressure differential is increased, the vortex V1 is pushed toward the receiver 120 blocking leg 114 leading to output port 110 and deflecting the supply jet 120 toward leg 116 leading to output port 112.

As the pressure differential further increases, the supply jet 120 is deflected so that it no longer strikes the area 119 on the left side of chamber 100, therefore vortex V1 is no longer formed. Since vortex V1 ceases, it can no longer act to block the receiver opening 120, (FIGURE 7). At this point, the amplifier begins to saturate. The amplifier now works completely on the pressure times area deflection phenomenon along the jet stream. As indicated in FIGURE 7, area A1 has increased considerably and the amplifier readily saturates as the supply jet is compressed completely into leg 116 with all of the jet flow passing into receiver opening 122 and none of the supply jet passing into receiver opening 120.

The shift in position of the right-hand vortex as it continues to move in response to control pressure differential increase is evident from viewing FIGURES 7 and 8. While it continues to move downwardly in FIGURE 7 from point 126' to point 126", it tends to move slightly to the left, as indicated by arrow 132. This downward and leftward movement continues for point 126" to point 126''' until complete saturation is reached, the distance and the direction being shown by arrow 134. The amplifier exhibits the same type of performance when the control pressure gradient goes from control port 108 to control port 106.

From the above, it is obvious that the geometry of the analog amplifier has been optimized to allow vortex movement to act to a maximum effect on the power jet stream. Since the control signal enters perpendicular to the plane of the element, there is no momentum exchange effect on either the vortexes or the jet stream. The control signals do affect the vortexes by a pressure times area phenomenon which is turn influences the jet. While there is a pressure times area effect on the jet stream, it is a much lesser effect. Since the vortex shifts into a position where it completely blocks or covers one of the chamber receiver openings, the ability of the device to perform an amplifying function is obviously enhanced. Not only do present analog amplifiers use momentum exchange phenomenon between the supply jet and a control jet, applied directly at the mouth of a supply nozzle, but they do not take advantage of the control function provided by a vortex readily movable within the chamber to affect a supply jet at a point or points downstream of the supply nozzle. Based on these principles, the present amplifier will operate over a wider range of supply pressures and control pressures allowing the use of supply pressures, output pressures and control pressures several times larger than existing analogs. Because of this, there is no requirement for close impedance matching when the amplifier is used in system application. The present amplifier involves simple, rugged geometry making it easy to produce. The element will work with a higher pressure recovery than existing elements since it may be constructed without vents, which are common to existing analog elements. As a result, an overall slightly better pressure gain is achieved. However, the element will work with a vented chamber.

While no specific dimensions are given for the fluid amplifier of the present invention, it might be said that, in general, the receiving openings are positioned downstream from the supply stream from the supply stream nozzle opening a distance approximating six to eight times the width of the nozzle opening. Likewise, while the chamber configuration and geometry is subject to variation, it is preferred that the configuration of the chamber constitutes in general a right triangle in the manner shown. With the power jet stream opening up into the triangular chamber and fanning out from the apex end toward the base line, the right- and left-hand edges of the jet stream, in striking the forward or downstream wall, produce the required vortexes on either side of the jet stream between the jet stream and the control ports which are at right angles therto. However, if the average of the pressures at the control inlets is greater than about 50% of the jet stream pressure, the control pressure will tend to compress and narrow the fanning jet stream to such an extent that the vortexes are virtually eliminated.

The advantages of using the fluidic pressure operated vortex controlled fluid analog amplifier in fluid systems may be readily seen from the schematic representation in FIGURE 9 of a seven stage analog amplifier system incorporating series connected, analog amplifiers 200 through 212, respectively. It is noted that the amplifiers are impedance matched to the control system by varying the element thicknesses, as indicated on the left-hand side of the drawing. Thus, the amplifier 200 for stage one is provided with an amplifier chamber and other cavity areas of a thickness of twenty thousandths of an inch while amplifier 212 in stage seven has chamber and passageway thicknesses in the order of thirty-five thousandths of an inch. The pressure for the power jets to respective supply ports also increases. For instance, supply port 214 associated with amplifier 200 is provided with a fluid supply at a pressure of 2 p.s.i.g. while at stage seven, amplifier 212 is supplied with a jet stream at supply port 216 having a pressure of 9 p.s.i.g. With an initial control pressure differential of .005 p.s.i.g. across control port inlets 218 associated with first stage fluid amplifier 200, there results an output pressure differential of 1.0 p.s.i.g. across output conduits 220 of stage seven amplifier 212. The seven stage analog amplifier system of FIGURE 9 therefore exhibits a pressure gain in the order of 200 for components having cavity thicknesses, supply pressures and an input differential for the first stage amplifier of the order shown.

From the typical seven stage analog amplifier system using the improved pressure operated vortex controlled fluid amplifiers of the present invention, it is seen that the improved analog amplifiers give the highest gain for the least flow when they are impedance matched to the control sources by adjusting the element thickness. Using elements having cavity thicknesses as thin as .020 inch, under given supply pressure and control pressure values, gains as high as 20 are achieved when properly impedance matched to the control source. To enhance balance, the supply nozzle for the analog amplifier should be long as compared to its width, preferably six times or more. Staging is improved by using gradually thickening elements to provide proper matching. The best staging is achieved with higher pressure gains by using gradually increasing supply pressures, as indicated. System staging from one amplifier to another can be readily obtained by direct connection between the output ports and control ports. In the sample shown, the average pressure gains for stage system is from 1.5 to 5.0 per stage.

What is claimed is:

1. An improved pressure operated vortex controlled pure fluid analog amplifier comprising: an amplifier control chamber, a jet power stream inlet coupled to said chamber and opening into the same, a pair of jet power stream outlets coupled to said chamber, control inlets coupled to said chamber on opposite sides and downstream of said jet power stream inlet, means for causing a portion of said incoming power jet stream to form free vortexes within said chamber between said power stream and said control inlets and means for providing a control pressure differential across said control inlets to shift said free vortexes within said chamber to selectively block the passage of said jet stream to one of said outlets thereby creating a fluid pressure differential across said outlets.

2. The pure fluid amplifier as claimed in claim 1 further including control ports coupled to said control inlets, said control port axis being generally perpendicular to the plane of fluid passing through said closed fluid amplifier chamber to substantially eliminate momentum exchange between the moving fluids.

3. The pure fluid amplifier as claimed in claim 2 further including a supply port, said supply port being positioned from said chamber inlet opening a distance on the order of six times the width of said supply inlet opening.

4. The pure fluid amplifier as claimed in claim 2 wherein said control ports are positioned downstream and outwardly of the jet power stream inlet to maximize pressure times area control on the vortexes and to ensure minimum momentum exchange between said control stream and said jet power stream.

5. The pure fluid amplifier as claimed in claim 1 wherein said control chamber is generally triangular in plan configuration, with said jet power stream inlet occupying one vortex of the triangle, one of said control inlets occupying each of the other vortexes, and said outlets being located adjacent each other and substantially in the center of the side of the triangle opposite and downstream from said power stream inlet.

6. The pure fluid amplifier as claimed in claim 1 wherein said means for causing a portion of said incoming power jet stream to form free vortexes within said chamber comprises a substantially flat chamber wall located downstream of said jet power stream inlet on either side of said power jet stream outlets and in the path of fanning outer edges of said power jet stream as it passes through said chamber and positioned substantially normal to the direction of flow of said jet power stream.

7. The pure fluid amplifier as claimed in claim 1 wherein said jet power stream outlets are positioned downstream from said jet power stream inlet a distance in the order of six times the width of the jet power stream inlet opening.

References Cited

UNITED STATES PATENTS

| | | | |
|---|---|---|---|
| 3,282,280 | 11/1966 | Horton | 137—81.5 |
| 3,285,262 | 11/1966 | Ernst et al. | 137—81.5 |
| 3,331,382 | 7/1967 | Horton | 137—81.5 |

FOREIGN PATENTS

| | | |
|---|---|---|
| 1,434,405 | 2/1966 | France. |

M. CARY NELSON, *Primary Examiner.*

W. R. CLINE, *Assistant Examiner.*